(12) United States Patent
Neutel

(10) Patent No.: US 7,563,067 B2
(45) Date of Patent: Jul. 21, 2009

(54) ROBOT

(75) Inventor: Ronald Walter Neutel, Amersfoort (NL)

(73) Assignee: Roboxis B.V., Barneveld (NL)

( * ) Notice: Subject to any disclaimer, the term of this patent is extended or adjusted under 35 U.S.C. 154(b) by 477 days.

(21) Appl. No.: 10/562,647

(22) PCT Filed: Jun. 29, 2004

(86) PCT No.: PCT/NL2004/000460

§ 371 (c)(1), (2), (4) Date: Dec. 27, 2005

(87) PCT Pub. No.: WO2005/009690

PCT Pub. Date: Feb. 3, 2005

(65) Prior Publication Data

US 2006/0210386 A1    Sep. 21, 2006

(30) Foreign Application Priority Data

Jun. 30, 2003    (NL) .................................... 1023776

(51) Int. Cl.
*B25J 5/04* (2006.01)

(52) U.S. Cl. ............... 414/751.1; 198/461.1; 414/749.1; 901/16; 901/21

(58) Field of Classification Search ............. 414/749.1, 414/751.1; 74/89.3, 89.2, 490.04; 901/16, 901/21; 198/346.2, 460.1, 461.1, 461.2, 198/464.1, 577, 957

See application file for complete search history.

(56) References Cited

U.S. PATENT DOCUMENTS

| | | | | |
|---|---|---|---|---|
| 3,760,956 A | * | 9/1973 | Burch ...................... 414/744.3 |
| 4,287,459 A | * | 9/1981 | Dahlstrom ............. 318/568.14 |
| 4,670,974 A | * | 6/1987 | Antoszewski et al. ......... 29/701 |
| 4,777,608 A | * | 10/1988 | Hashimoto et al. .......... 700/247 |
| 5,271,292 A | * | 12/1993 | Sawada et al. ........... 74/490.04 |
| 5,611,248 A | * | 3/1997 | Peltier ..................... 74/490.09 |
| 6,264,419 B1 | * | 7/2001 | Schinzel .................. 414/751.1 |

(Continued)

FOREIGN PATENT DOCUMENTS

DE    19608844 A1    9/1997

(Continued)

*Primary Examiner*—Donald Underwood
(74) *Attorney, Agent, or Firm*—Hoffmann & Baron, LLP; John S. Sopko

(57) ABSTRACT

A robot for gripping and handling one or more objects, which robot includes a stationary base with a first guide extending in a first direction, and an arm including a second guide extending in a second direction at an angle relative to the first direction, preferably perpendicularly to the first direction, which arm is connected to the base by way of the first guide in such a way that the arm is movable in the first direction. A slide is provided on the second guide and is movable in the second direction. A gripper supported by the slide, for gripping one or more objects, is movable in a third direction intersecting the plane of the first and second directions, preferably perpendicularly. A number of stationary actuators are provided on the base, for driving the arm, the slide and the gripper by means of pulling elements, for example drive belts, which are connected to the arm, the slide and the gripper respectively. The gripper is situated in an imaginary plane extending in the second and third directions and intersecting the central longitudinal axis of the arm.

22 Claims, 13 Drawing Sheets

U.S. PATENT DOCUMENTS 6,540,063 B1 * 4/2003 Fallas et al. .............. 198/461.1

FOREIGN PATENT DOCUMENTS

| | | |
|---|---|---|
| EP | 0 310 481 B1 | 2/1993 |
| FR | 2590560 A1 | 5/1987 |
| JP | 58-5977 | 8/1983 |
| WO | WO 86/02059 | 4/1986 |
| WO | WO 91/18718 | 12/1991 |
| WO | WO 96/37346 | 11/1996 |
| WO | WO 97/02931 | 1/1997 |
| WO | WO 97/32695 | 9/1997 |

* cited by examiner

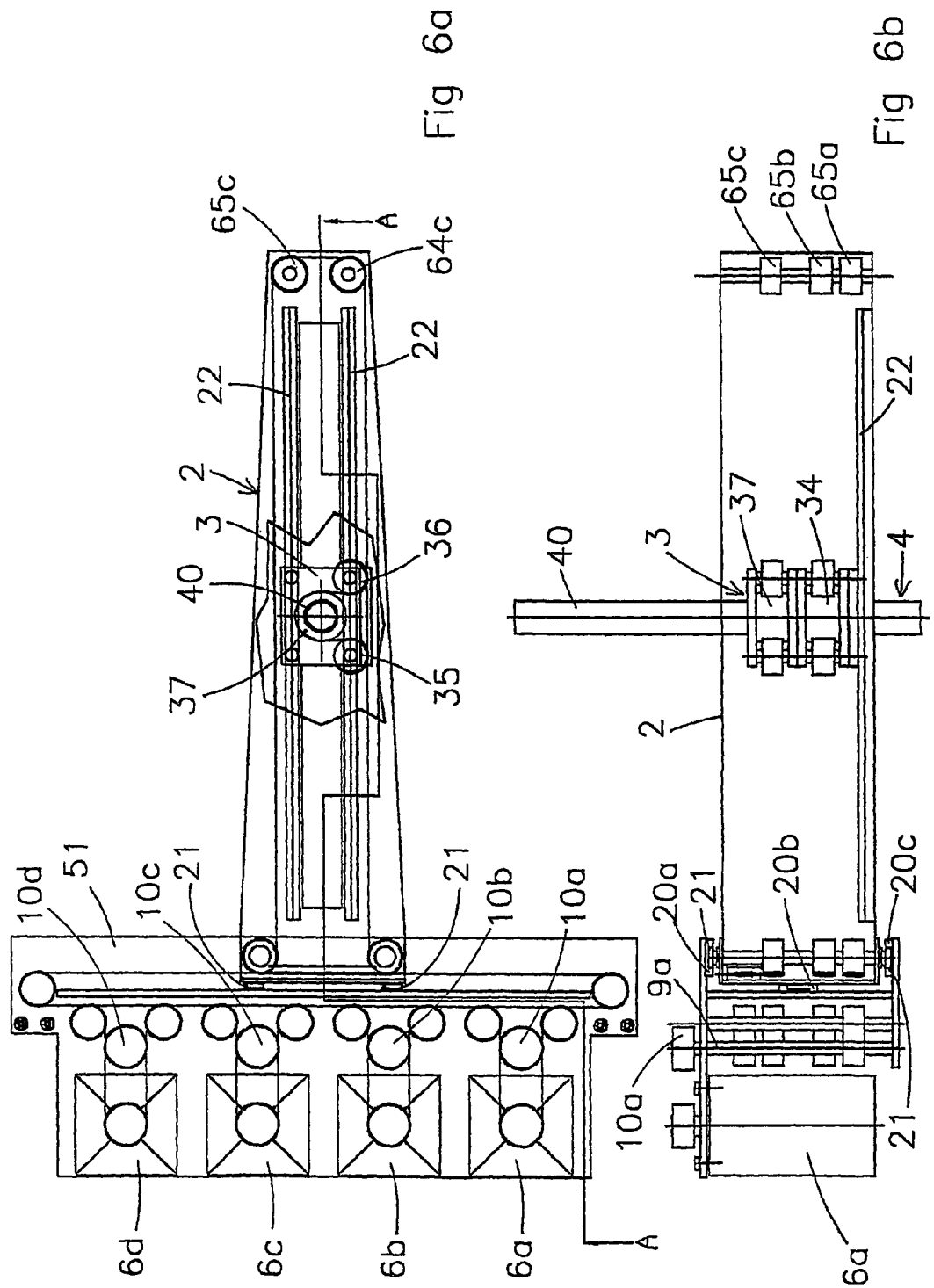

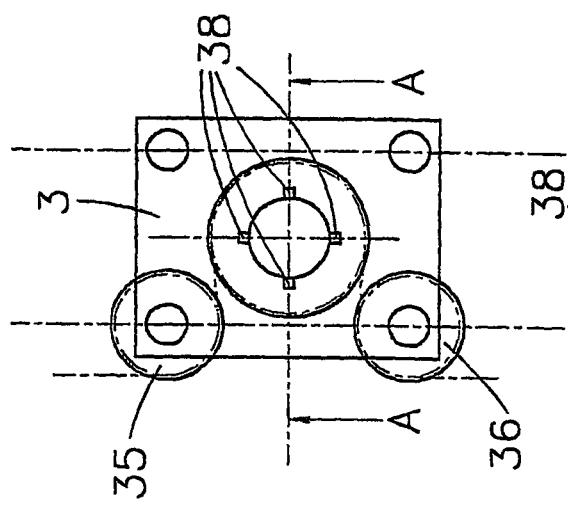
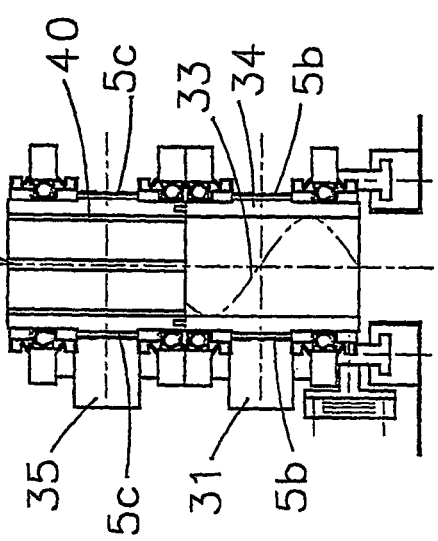
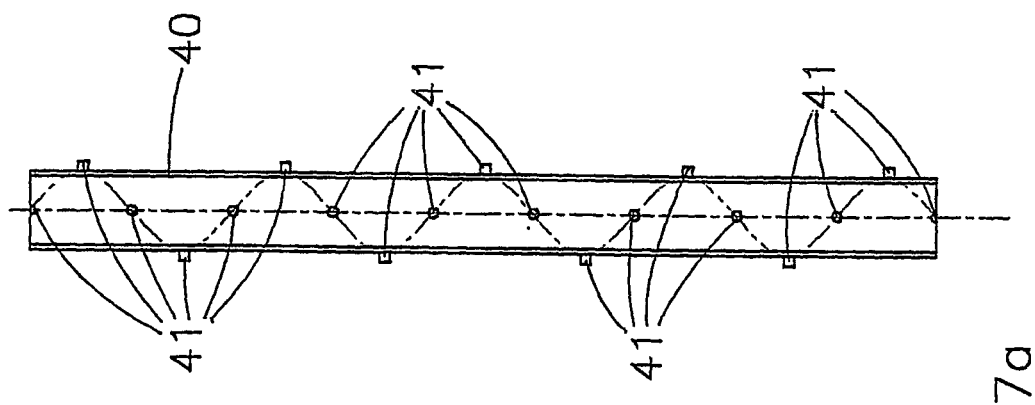

ROBOT

CROSS-REFERENCE TO RELATED APPLICATIONS

This application is the National Stage of International Application No. PCT/NL2004/000460, filed Jun. 29, 2004, which claims the benefit of Netherlands Application No. NL 1023776, filed Jun. 30, 2003, the contents of which is incorporated by reference herein.

FIELD OF THE INVENTION

The invention relates to a robot for gripping and handling one or more objects.

BACKGROUND OF THE INVENTION

In industry objects are conveyed from a production location on a conveyor such as a conveyor belt to a following location, where the objects are, for example, removed from the conveyor belt and then placed in a pack or a processing machine. In the food industry, for example, for the sake of hygiene, ergonomics and flexibility, these operations are increasingly being automated and performed by robots.

In the case of specific applications, such as, for example, the packaging of biscuits, sweets or sausages, the robots are used to remove individual products from a moving conveyor belt and, for example, to place them in a pack alongside the belt. This process is known as single picking.

Single-picking robots must have a working range which covers part of the length and the full width of the conveyor belt and some form of pack, such as, for example, a packaging box, when there is a robot standing on one side of the conveyor belt, or half the width when there is a robot standing on both sides of the conveyor belt, in order to ensure that at every desired position within that range individual products can be gripped on the belt and placed in some form of pack. For the speed of the operation in this application it is particularly important for the robot to have a gripper which can move at high speed across the width of the conveyor belt. It is also important for the robot to be sufficiently strong and to be able to withstand a certain load, produced by, for example, the weight of the product and the gripper.

It is known to use scara robots or delta robots for the single-picking application. An example of a scara robot is shown in FIG. 1. An example of a delta robot is shown in FIG. 2 and is known, for example from EP 0 250 470. One feature of these known types of robot is that they have robot arms which are hingedly mounted relative to the fixed environment and relative to each other, so that the movement of one robot arm results in a circular path of the gripper. In the case of these robots a linear movement of the gripper can be obtained only by simultaneous movement of several arms, which in practice means that two or more weights must be moved during the movement. A fast linear movement over a relatively great distance, namely the width of the conveyor belt, requires a fast movement of several arms. This is possible in practice only if the robot arms have a low mass inertia, which particularly as far as scara robots are concerned is not the case. In the case of delta robots the construction is often more fragile, so that the mass inertia of the aims is less of a problem than it is in the case of scara robots. However, the fragile construction considerably restricts the load to which the delta robot can be subjected, which means that the latter can be used only for gripping light objects with a light gripper. Since the present robots are therefore either strong and slow (scara robot) or fragile and fast (delta robot), their usability and practical application is limited.

A further disadvantage of the construction of the scara robots and the delta robots is that when one of the arms moves the remaining arms are subjected to a load by the reaction forces which have been produced. These loads can rise to a high level at high speeds, with the result that the arms have to be of a heavier design, which increases the mass inertia, and this in turn adversely affects the speed. Furthermore, some arms purely bear the weight of the other arms.

Another disadvantage of the known robots is that they have a circular working range. This means that there is always an effective speed component in the desired direction and a useless speed component perpendicular to it. In order to be able to reach all points within the working range at an adequate speed, the arms therefore have to be much longer than the width of the conveyor belt. Nevertheless, the speed achievable in the desired crosswise direction of the conveyor belt will not be able to reach the same level in the region farthest away from the robot that it can reach close to the robot.

Such a robot is known from DE 196 08 844. In the case of the known robot a drive device is provided on one end of the base. The drive device includes several motors which engage on toothed belts in order to drive the arm and the slide. The known robot has a gripper which is fitted on one side of the slide and therefore extends alongside the arm. In the case of this known construction torsional forces occur on the arm when a product is being lifted with the gripper, which leads to a heavier construction of the base, the arm and other parts of the robot, in order to enable them to offer resistance to these torsional forces. The heavier construction has an adverse effect on the speed of the robot.

An object of the invention is to provide an improved robot which is capable of working at higher speed.

SUMMARY OF THE INVENTION

This object is achieved by a robot for gripping and handling one or more objects, which robot comprises:

a stationary base with a first guide extending in a first direction, an arm comprising a second guide extending in a second direction at an angle relative to the first direction, preferably perpendicularly to the first direction, which arm is connected to the base by way of the first guide in such a way that the arm is movable in the first direction, a slide which is arranged on the second guide and is movable in the second direction, a gripper supported by the slide, for gripping one or more objects, which gripper is movable in a third direction intersecting the plane of the first and second directions, preferably perpendicularly, a number of actuators provided in a stationary position on the base, for driving the arm, the slide and the gripper by means of pulling elements, for example drive belts, which are connected to the arm, the slide and the gripper respectively, wherein the gripper is situated in an imaginary plane extending in the second and third directions and intersecting the central longitudinal axis of the arm. The advantage of this is that when a product is being lifted by the robot no torsional forces occur on the arm. Owing to the absence of torsional forces which require resistance to be offered to them, a lighter construction of the arm will suffice, which results in fast dynamic behaviour of the robot.

In the case of the robot known from DE 196 08 844 the translation of the gripper is obtained by the fact that a pulley is driven by a toothed belt, which pulley, by way of a right-angled transmission, drives a second pulley situated at right angles to it. The rotation of the second pulley causes the translation in the third direction of a toothed belt interacting with the second pulley and of the gripper connected to it. This known construction has the disadvantage that it is heavy, and a great weight on the arm therefore has to be moved along in the second direction when the slide has to be moved in the second direction. This weight also has to be carried along in the first direction when the arm is moved in the first direction. This is undesirable from the point of view of quick dynamic behaviour of the robot.

In a preferred embodiment of the invention this disadvantage is overcome by the fact that a first bush and a second bush are provided on the slide, which bushes are drivable by means of a pulling element. The gripper further comprises a round shaft member projecting through both bushes, the shaft member being provided on the periphery with cams placed in a spiral shape, the first bush being provided with a spiral-shaped groove which can interact with the cams on the shaft member in such a way that a rotation of the first bush results in a translation of the shaft member, and the second bush being provided with at least one straight axial groove which can interact with the cams in such a way that a rotation of the second bush results in a rotation of the shaft member. The first and second bushes are preferably each drivable by means of a separate pulling element. The gripper can therefore be translated in the third direction and can be rotated about an axis of rotation extending in the third direction by the bushes being driven by the pulling elements. The bushes are light, with the result that fast dynamic behaviour of the robot in the first and second directions is ensured. Furthermore, the bushes are situated one above the other, so that the axis of translation of the gripper in the third direction and the axis of rotation of the gripper coincide, with the result that, unlike the robot known from DE 196 08 844, a compact and symmetrical construction is obtained.

The shaft member is preferably removable. The gripper comes into contact with the products to be gripped and/or handled, and it is desirable to be able to clean said gripper easily, for example for the sake of hygiene. The fact that the shaft member is removable makes it easy to clean, while the means for driving the shaft member can remain in place.

In a possible embodiment of the invention the robot comprises a housing which surrounds a space in which the guides, the slide, the actuators and the pulling elements are accommodated, the base comprising a first housing part, and the arm comprising a second housing part. Owing to the fact that the actuators and the pulling elements in particular are situated inside the housing, full shielding of the drive elements is ensured. This means that, for example, wear particles coming off the pulling elements do not fall onto the products to be handled, which is important in, for example, the food industry. Furthermore, this can also ensure, for example, that hands or clothing of personnel do not become caught up between the drive elements. Moreover, the housing gives the robot an attractive appearance on the outside. In addition, the housing acts as an external skeleton. This means that if there are pulling force differences in the different pulling elements, the construction, and in particular the arm, is subject only to pressure, and not to bending stress, as is the case with the known robot according to DE 196 08 844. The arm of the robot according to the invention can therefore be of a very light construction, which without loss of strength results in faster dynamic behaviour of the robot in the first direction.

The first and second housing parts are preferably made of plastic and/or stainless steel sheets. This has the advantage that the robot is light. Furthermore, the choice of material for the housing parts is advantageous from the point of view of hygiene in applications where hygiene plays an important part.

The housing and the parts situated inside it are preferably of a design which can be cleaned. This means that the robot can be cleaned easily on the inside and on the outside, without the housing and the parts situated inside it being adversely affected by water and/or cleaning agents and disinfectants. This cleaning is important when, for example, the robot is being used in the food industry.

In a further embodiment of the invention, the actuators, viewed in the first direction, are distributed on the base.

The fact that the actuators are distributed on the base in the first direction produces a robot in the case of which no additional space is used for placing the actuators on the end of the base, which results in a robot which, while having the same stroke length in the first direction, takes up less space and is therefore more compact. This means that per unit length more robots can be set up than is the case with the robot known from DE 196 08 844, so that, for example, a conveyor and/or the space in which said conveyor is set up does not have to be made as long, which leads to a considerable cost saving.

The actuators are preferably disposed at the same height. This has the advantage that the robot takes up less space, viewed in the third direction.

The actuators are preferably disposed in such a way relative to the arm, the slide and the gripper that the pulling elements are of equal length. This has the advantage that only one length of pulling element is required, which makes the purchase of pulling elements cheaper. The replacement of pulling elements is consequently cheaper, and the maintenance costs of the robot are therefore kept to a minimum.

The actuators are preferably identical. This has the advantage that only one type of actuator is required, which makes the purchase of actuators cheaper. The placing, connection and maintenance of the actuators are also easier and cheaper because all actuators can be handled and mounted in the same way.

In a further preferred embodiment of the invention, the pulling elements and the actuators are connected by means of a transmission. The pulling elements are consequently not directly connected to the actuators, with the result that a transmission ratio can be achieved which is such that only one type of motor is required.

Gear transmissions require oil or another lubricant. The oil can contaminate the products. This is unacceptable in many applications, in particular in the food industry. The transmission is preferably designed with pressure rollers. A transmission with pressure rollers does not require lubrication and is therefore suitable for those applications.

The base is preferably fitted on a mobile frame. The advantage of this is that the robot is easy to move, with the result that said robot can be used flexibly in different production rooms. The mobile robot can also be moved easily to, for example, a cleaning room outside the production room. A mobile robot is advantageous in industry from the point of view of efficiency and effectiveness. In order to fix the robot for use, it is possible to provide positioning means and fixing means in the production room.

A further aspect of the invention relates to a robot for gripping and handling one or more objects, which robot comprises:

a stationary base with a first guide extending in a first direction, an arm comprising a second guide extending in a second direction at an angle relative to the first direction, preferably perpendicularly to the first direction, which arm is connected to the base by way of the first guide in such a way that the arm is movable in the first direction, a slide which is arranged on the second guide and is movable in the second direction, a gripper supported by the slide, for gripping one or more objects, which gripper is movable in a third direction intersecting the plane of the first and second directions, preferably perpendicularly, a number of actuators provided in a stationary position on the base, for driving the arm, the slide and the gripper by means of pulling elements, for example drive belts, which are connected to the arm, the slide and the gripper respectively, wherein the actuators, viewed in the first direction, are distributed on the base.

Another aspect of the invention relates to a robot for gripping and handling one or more objects, which robot comprises:

a stationary base with a first guide extending in a first direction, an arm comprising a second guide extending in a second direction at an angle relative to the first direction, preferably perpendicularly to the first direction, which arm is connected to the base by way of the first guide in such a way that the arm is movable in the first direction, a slide which is arranged on the second guide and is movable in the second direction, a gripper supported by the slide, for gripping one or more objects, which gripper is movable in a third direction intersecting the plane of the first and second directions, preferably perpendicularly, a number of actuators provided in a stationary position on the base, for driving the arm, the slide and the gripper by means of pulling elements, for example drive belts, which are connected to the arm, the slide and the gripper respectively, wherein the robot is provided with a housing comprising a first housing part which surrounds the base and a second housing part which surrounds the arm.

In yet another aspect of the invention, a robot is proposed for gripping and handling one or more objects, which robot comprises:

a stationary base with a first guide extending in a first direction, an arm comprising a second guide extending in a second direction at an angle relative to the first direction, preferably perpendicularly to the first direction, which arm is connected to the base by way of the first guide in such a way that the arm is movable in the first direction, a slide which is arranged on the second guide and is movable in the second direction, a gripper supported by the slide, for gripping one or more objects, which gripper is movable in a third direction intersecting the plane of the first and second directions, preferably perpendicularly, a number of actuators provided in a stationary position on the base, for driving the arm, the slide and the gripper by means of pulling elements, for example drive belts, which are connected to the arm, the slide and the gripper respectively, wherein a first bush and a second bush are provided on the slide, which bushes are drivable by means of a pulling element, and in that the gripper comprises a round shaft member projecting through both bushes, the shalt member being provided on the periphery with cams placed in a spiral shape, the first bush being provided with a spiral-shaped groove which can interact with the cams on the shaft member in such a way that a rotation of the first bush results in a translation of the shaft member, and the second bush being provided with a straight axial groove which can interact with the cams in such a way that a rotation of the second bush results in a rotation of the shaft member.

The invention further relates to a conveyor system comprising a conveyor and a robot as is described above, in which the robot is designed to pick up one or more objects from a conveyor and to place the object(s) at a location next to the conveyor.

The invention also relates to a method for packaging foods, in which use is made of the said conveyor system.

BRIEF DESCRIPTION OF THE DRAWINGS

The invention will be explained in greater detail in the description below, with reference to the drawings, in which:

FIG. 3b shows an exploded view of the robot of FIG. 3a;

FIG. 4a shows another diagrammatic view in perspective of the robot of FIG. 3a;

FIG. 4b shows an exploded view of the robot of FIG. 3a according to the view of FIG. 4a;

FIG. 4c shows an exploded view of the robot of FIG. 3a without actuators according to the view of FIG. 4a;

FIG. 6a shows a top view of the robot of FIG. 3a;

FIG. 6b shows a cross section of the robot along the line A-A in FIG. 6a;

FIG. 7a shows an axial section of a shaft member of a gripper for a robot according to the invention;

FIG. 7b shows a cross section along the line A-A in FIG. 7c of the slide of the robot according to the invention;

FIG. 7c shows a cross section of the slide of the robot according to the invention;

FIG. 9a shows a top view of a detail of a possible belt drive in an idle position of the robot of FIG. 3a;

DETAILED DESCRIPTION OF PREFERRED EMBODIMENTS

Figure 1:
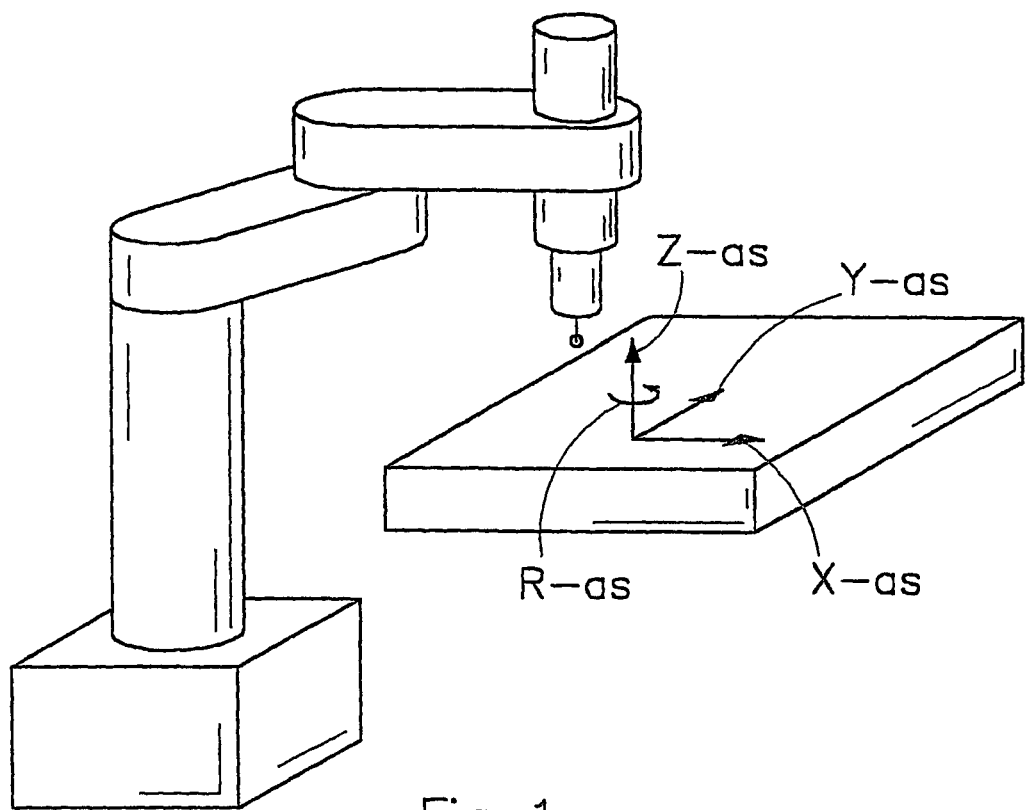
FIG. 1 shows a diagrammatic view of a scara robot known from the prior art.
Figure 2:
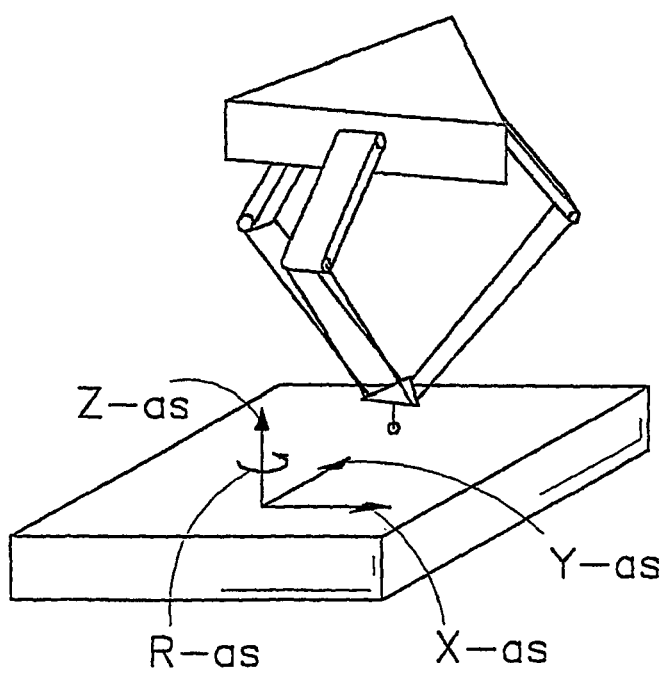
FIG. 2 shows a diagrammatic view of a delta robot known from the prior art.
Figure 3A:
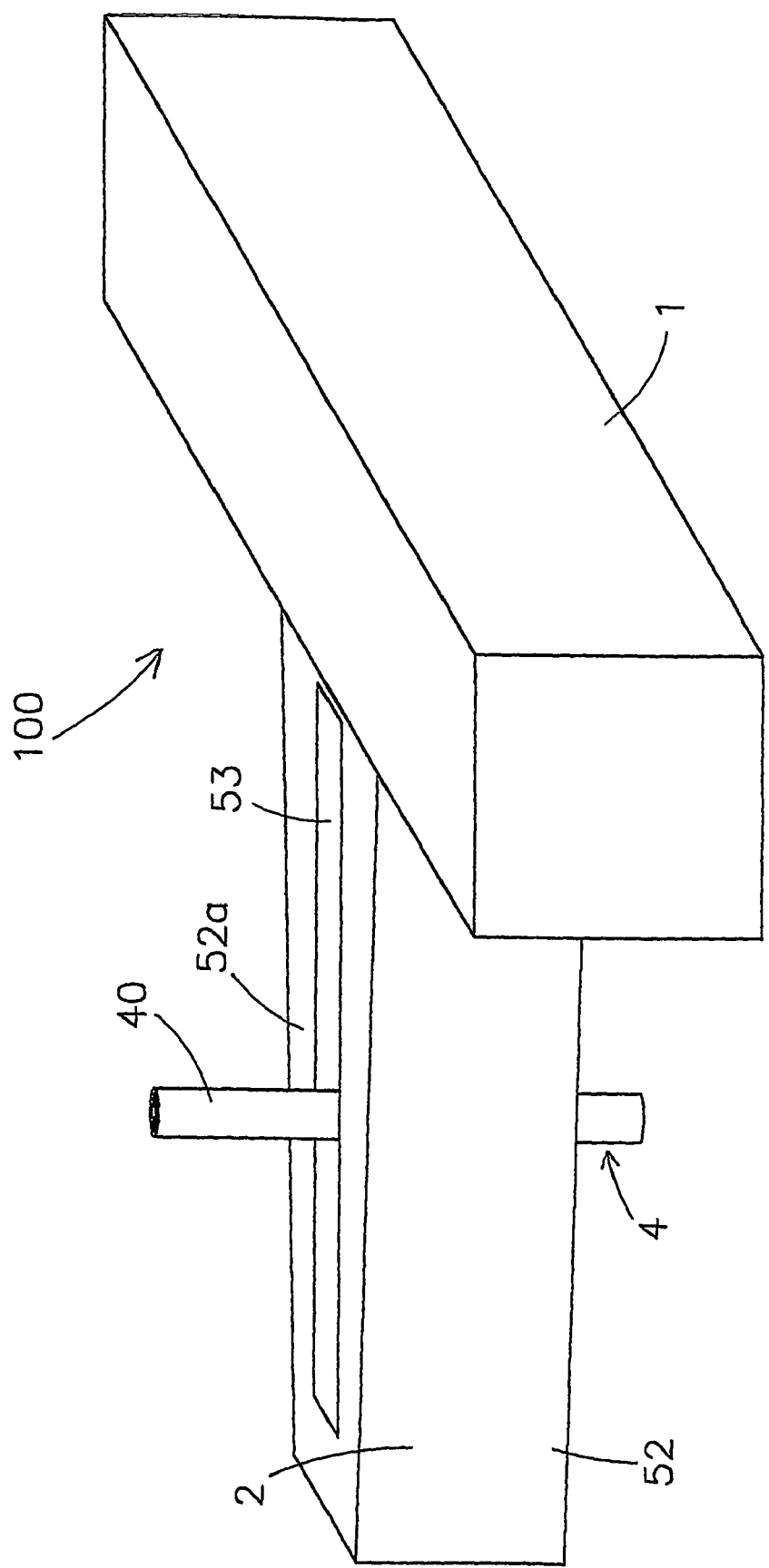
FIG. 3a shows a diagrammatic view in perspective of a robot according to the invention.
Figure 3B:
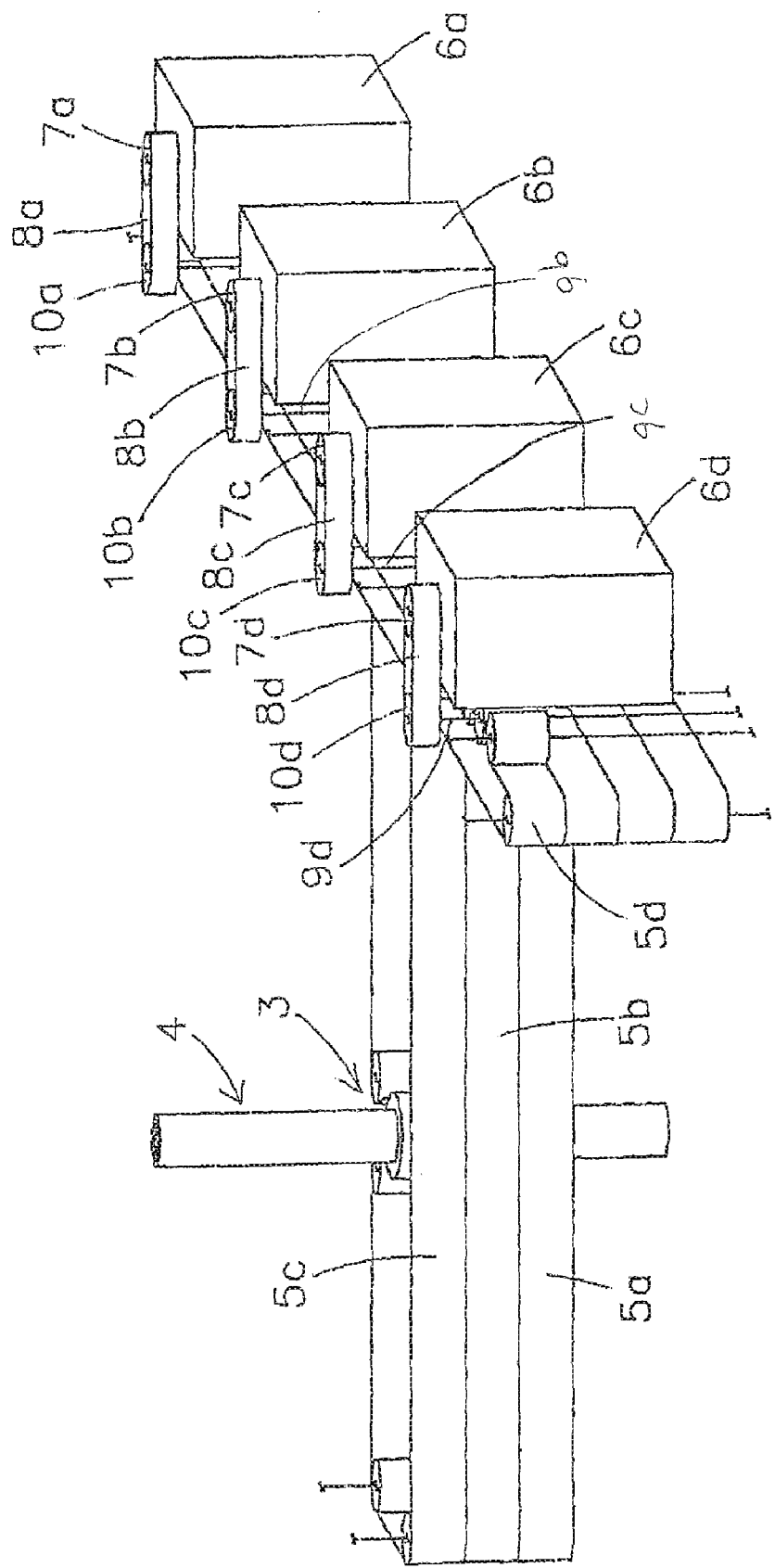
Figure 3C:
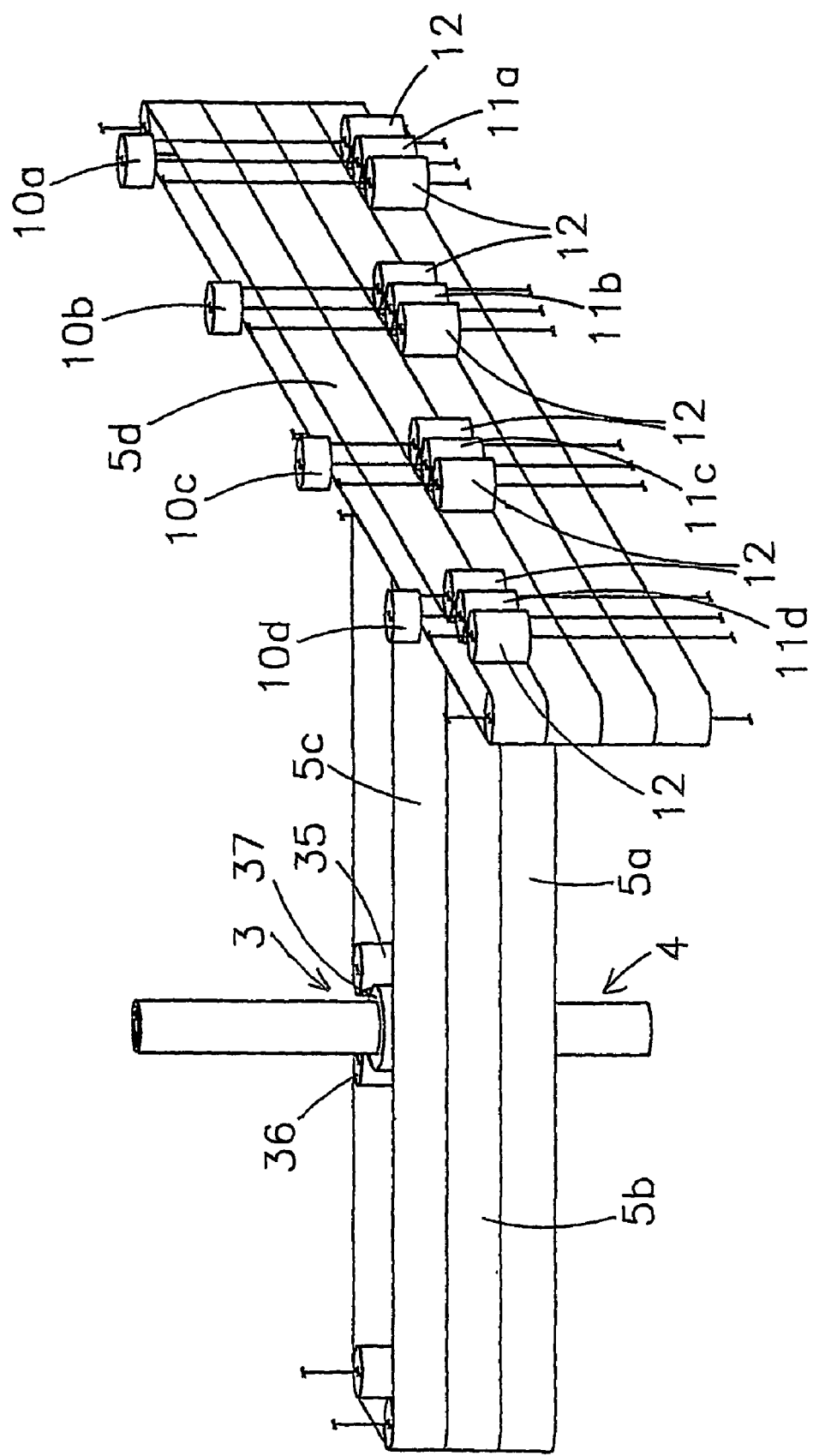
FIG. 3c shows an exploded view of the robot of FIG. 3a without actuators.
Figure 4A:
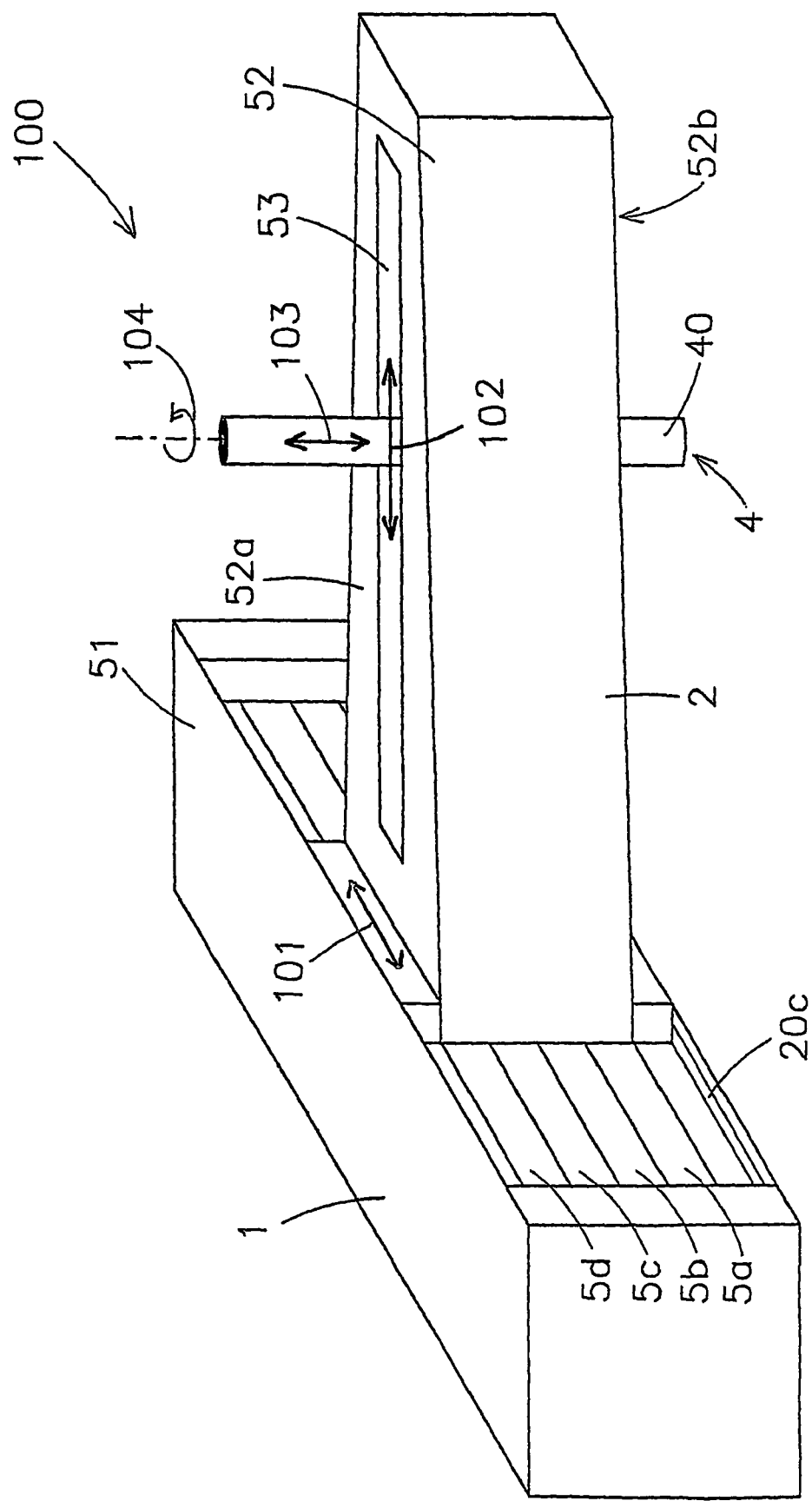

FIGS. 3a to 3c and 4a to 4c show a robot 100 according to the invention. The robot 100 comprises a stationary base 1 with a first guide extending in a first direction. The guide is formed by three rail elements 20a-20c, which can be seen in FIG. 6b and FIG. 4a. The first direction is indicated in FIG. 4a by a double arrow 101.

The robot 100 further comprises an arm 2, which comprises a second guide 22 (see FIG. 6a), which extends in a second direction at an angle relative to the first direction, preferably perpendicularly to the first direction. The second direction is shown in FIG. 4a by a double arrow 102. The arm 2 is supported by way of bearings 21 by the first guide 20a-20c. The arm 2 is movable in the first direction by way of the first guide 20a-20c.

A slide 3, which is movable in the second direction, is provided on the second guide 22 (see FIGS. 6a and 6b). In FIG. 6a a position of the slide 3 on the arm 2 is shown from above.

The slide 3 bears a gripper 4 for gripping one or more objects. The gripper 4 is movable in a third direction which intersects the plane of the first and second directions, preferably perpendicularly. The third direction is illustrated in FIG. 4a by the double arrow 103. Furthermore, the gripper 4 is rotatable about an axis parallel to the third direction. The rotation is shown in FIG. 4a by the double arrow 104.

Figure 4B:
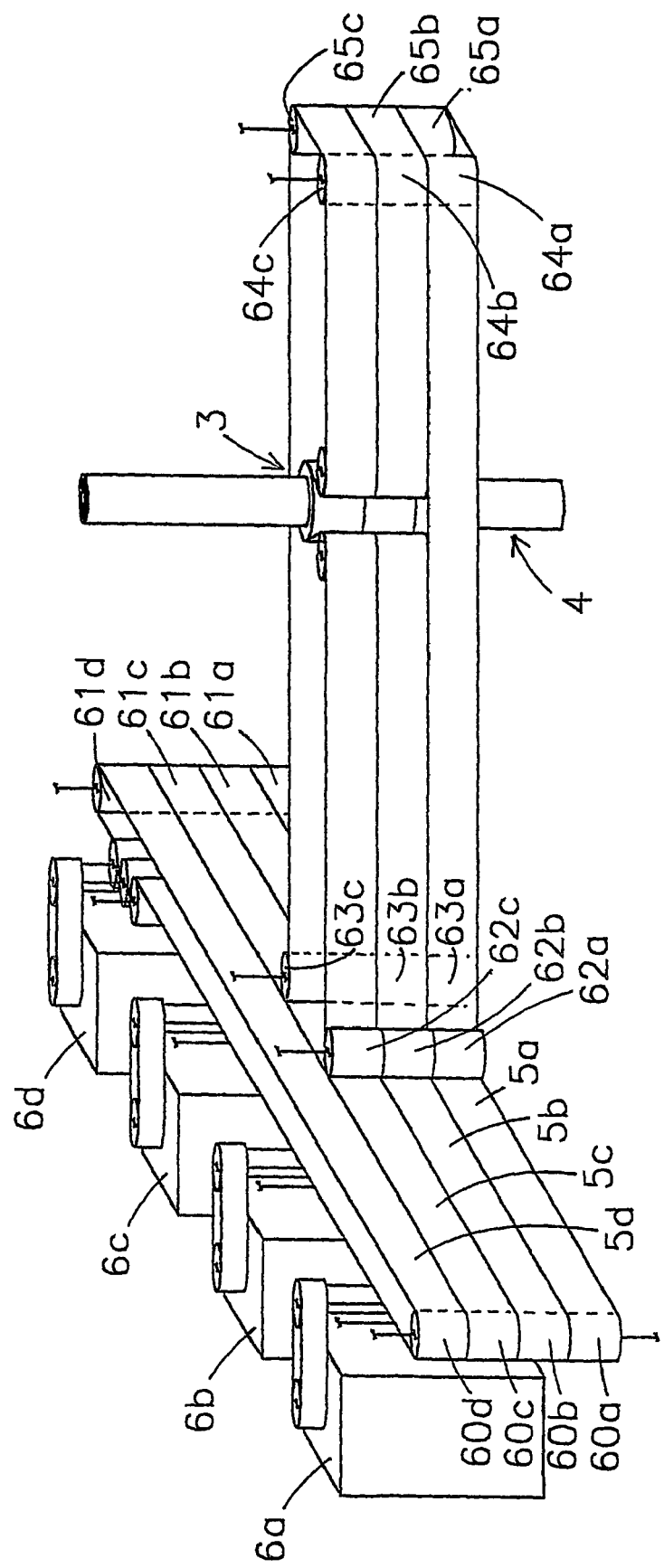
Figure 4C:
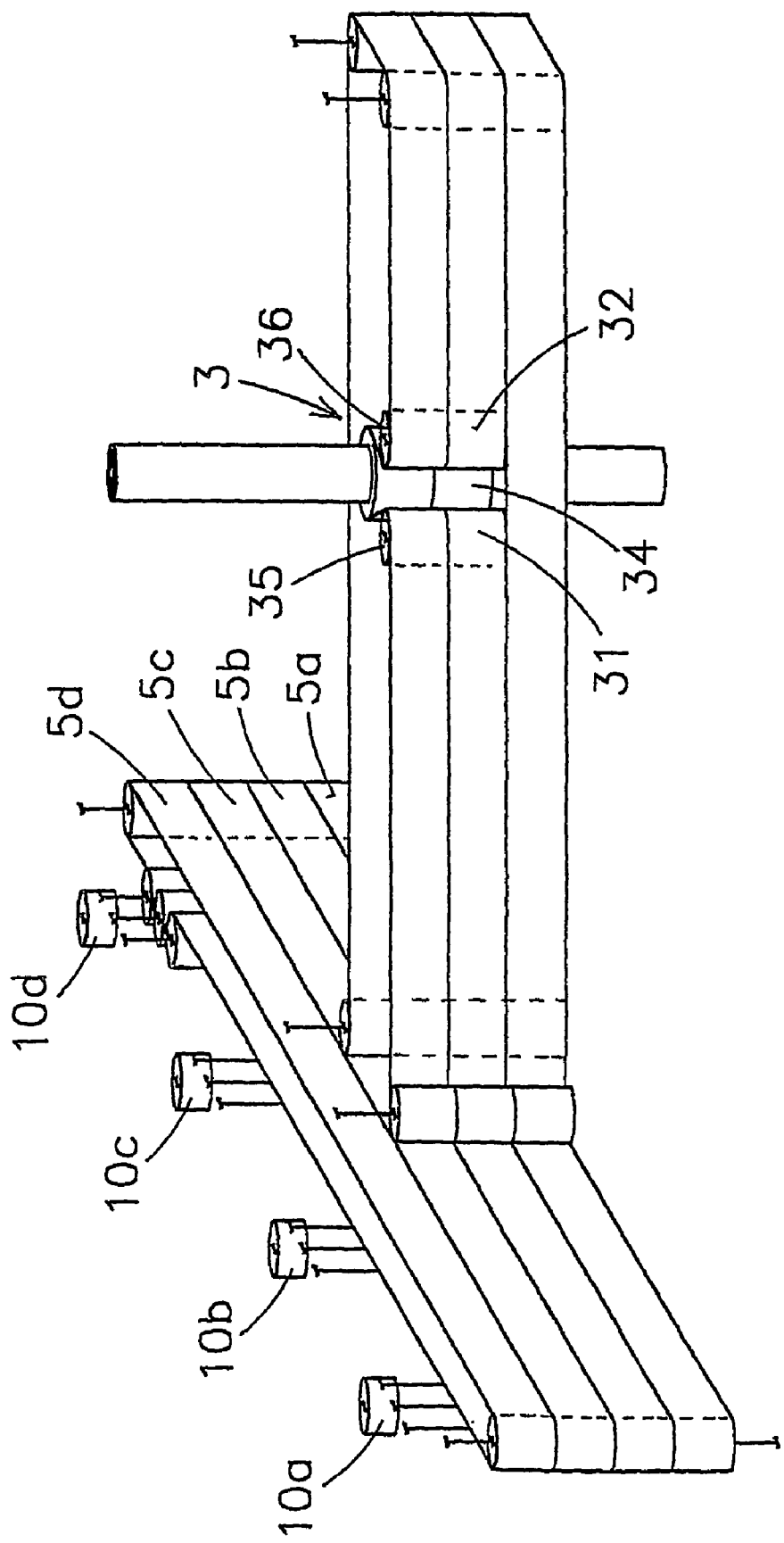

Four actuators, preferably the same actuators 6a-6d, are distributed on the base 1, viewed in the first direction. The actuators 6a-6d drive the arm 2, the slide 3 and the gripper 4 by means of pulling elements (see FIG. 4b). The pulling elements in the example shown are in the form of endless drive belts 5a-5d. The drive belt 5d is connected to the arm 2 in order to drive said arm in the first direction. Drive belt 5a is connected to the slide 3 in order to drive said slide in the second direction. The drive belts 5c and 5b are connected to the gripper 4 in order to drive said gripper in the third direction or to make it rotate about an axis extending in the third direction, as will be explained in greater detail further on in the description. As indicated in FIG. 4b, the drive belts 5a-5d are guided around by means of pulleys 60a-60d, 61a-61d which are provided on the base. Furthermore, the drive belts 5a-5c are guided around over the arm 2 by pulleys 62a-62c, 63a-63c, 64a-64c and 65a-65c.

The motor shafts 7a-7d of actuators 6a-6d are in each case connected by means of a transmission belt 8a-8d to a first pulley 10a-10d provided on an intermediate shaft 9a-9d, as can be seen in FIG. 3b. The intermediate shafts 9a-9d are provided in a stationary position in the base 1. A second pulley 11a-11d is provided in each case on the intermediate shaft 9a-9d, around which pulleys the respective drive belts 5a-5d lie. Next to the second pulleys 11a-11d two guide pulleys 12 are provided, which guide pulleys ensure that the drive belts 5a-5d are guided around the respective second guide wheels 11a-11d. The use of intermediate shafts 9a-9d with first pulleys 10a-10d which are all situated at the same height has made it possible for the actuators 6a-6d to be provided at the same height, while the second pulleys 11a-11d are situated at a different height and can therefore act upon the drive belts 5a-5d. This means that the actuators 6a-6d do not have to be placed at different heights in order to be able to act upon the drive belts 5a-5d, and that they do not take up much space in the vertical direction on the base 1.

Figure 9A:
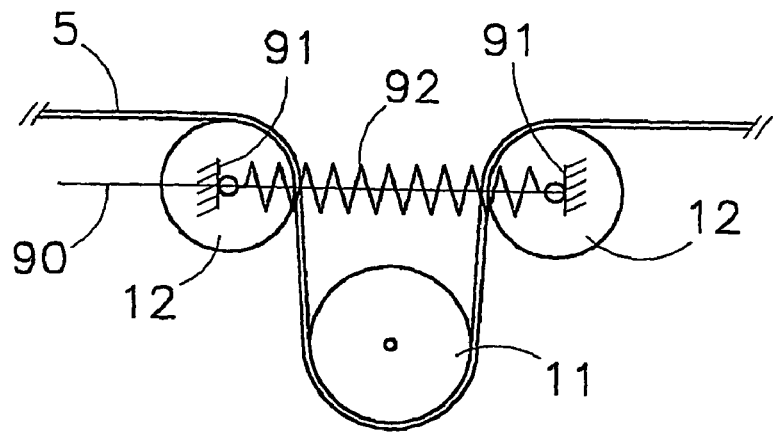
Figure 9B:
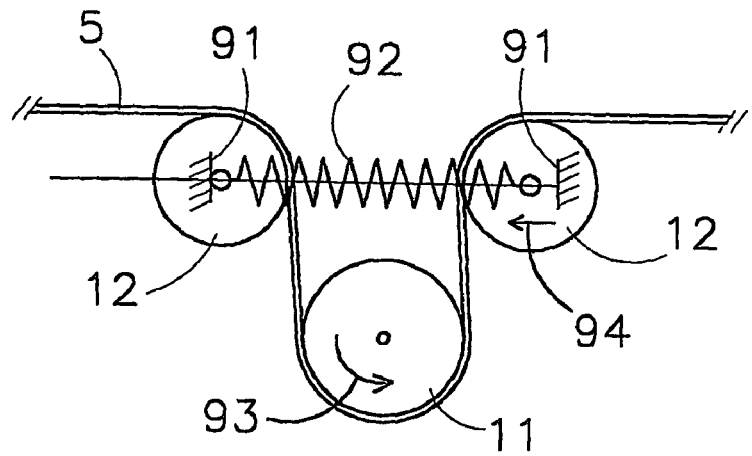
FIG. 9b shows a top view of the detail of FIG. 9a in a working position.
Figure 10:
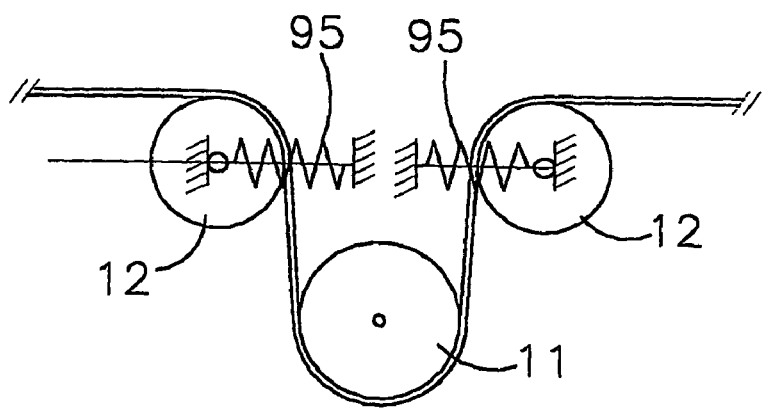
FIG. 10 shows a top view of a detail of an alternative belt drive in an idle position of the robot of FIG. 3a, and FIG. 11 shows a schematic view of a conveyor system according to the invention.

In FIGS. 9a, 9b and 10 and the relevant part of the description the motor with reference numeral 6 can be one of the motors 6a-6d, and the belt 5 can be one of the belts 5a-5d.

In a preferred embodiment the guide pulleys 12 are mounted so that they can slide. FIG. 9a shows an idle position, in which the pulleys 11 and 12 are stationary. The guide pulleys 12 can slide along a line 90 which connects the axes of the guide pulleys 12.

On the side of each guide pulley 12 facing away from the other guide pulley 12 a stop 91 is provided next to each guide pulley 12. The stop 91 acts, for example, on the rotary shaft of the guide pulley 12, as shown in FIG. 9a, and ensures that the guide pulley 12 cannot move outwards relative to the idle position away from the other guide pulley 12.

In the embodiment shown in FIG. 9a the two guide pulleys 12 are connected to each other by means of a tension spring 92. When the pulley 11 is set in rotation by the motor 6, as indicated by the arrow 93 in FIG. 9b, the belt 5 will be subjected to tension on the left-hand side in the figure and will stretch. Had the guide pulleys 12 been disposed in a stationary position, the belt 5 on the right-hand side of the pulley 11 would have rested in a slack state against said wheel, with the result that the belt 5 could have started to slip. This problem occurs particularly at very great accelerations or speed reductions of the motor 6, and consequently of the pulley 11. The tension spring 92 in the preferred embodiment ensures that in this case the guide pulley 12 on the right-hand side is moved in the direction of the guide pulley 12 on the left-hand side, as is indicated by an arrow 94. This makes the travel length of the belt 5 longer, and said belt is tensioned again. The advantage of this construction is that with the motor 6 greater accelerations and speed reductions can be passed on to the belt 5 without the belt 5 starting to slip relative to the pulley 11 and the guide pulleys 12. It is, of course, clear that in the case of a reversed direction of rotation of the pulley 11 the left-hand guide pulley 12 will be moved inwards and the right-hand guide pulley 12 will rest against the stop 91.

As an alternative to the embodiment of FIGS. 9a and 9b, in the case of which the guide pulleys 12 are connected by a spring 92, each guide pulley 12 can also be connected by a separate spring 95 to a fixed part of the construction, as is shown in FIG. 10. This alternative embodiment functions in the same way as the embodiment shown in FIGS. 9a and 9b.

The actuators in the embodiment shown are positioned uniformly distributed over the base. It is also possible, for example, for the actuators to be positioned in pairs on the base, two actuators being placed one behind the other. Otherwise, all four of the actuators can be positioned one behind the other.

The intermediate shafts 9a-9d make it possible to control several robots with one set of actuators. The robots can then perform the same movement simultaneously.

Pulleys 31 and 32, which guide the drive belt 5b around a first bush 34, are provided on the slide 3. Provided above the pulleys 31 and 32 are pulleys 35 and 36, which guide the drive belt 5c around a second bush 37.

The gripper 4 comprises a round shaft member 40, which projects through the two bushes 34 and 37, and which in FIG. 6b is shown at a position of the slide 3 in approximately the centre of the arm 2, and is shown enlarged in FIG. 7a. The shaft member 40 has cams 41 placed on the periphery in a spiral shape (shown by a dotted line). It can be seen in FIG. 7b that the first bush 34 is provided with a spiral-shaped groove 33, which can interact with the cams 41 on the shaft member 40 in such a way that a rotation of first bush 34 results in a translation of the shaft member 40. The second bush 37 is provided with a straight axial groove 38, which can interact with the cams 41 in such a way that a rotation of the second bush 37 results in a rotation of the shaft member 40. FIG. 7c shows a cross section through the slide at the level of the second bush 37, the four grooves 38 being visible.

The shaft member is preferably of a hollow design, in order to make it possible to apply a vacuum, so that objects can be picked up by it. Furthermore, air lines, electric cables and the like can be passed through the hollow shaft member.

It must be pointed out that the construction with a shaft member with cams which is driven by means of bushes with grooves can also be used in other robots or other devices.

The robot 100 comprises a housing, comprising a first housing part 51 and a second housing part 52. The first housing part 51 forms the bearing construction of the base 1. The second housing part 52 forms the bearing construction of the arm 2. The housing parts 51 and 52 bound a space in which the guides, the slide 3, the actuators 6a-6d and the pulling elements 5a-5d are accommodated.

The second housing part 52 has a top cover 52a and a bottom cover 52b, in which covers a slit 53 is present, through which slit the shaft member 40 of the gripper 4 can move when the latter is moved in the second or third direction.

The first and second housing parts 51, 52 are preferably made of plastic and/or stainless steel sheets, which are, for example, bent to the form of a housing. The housing parts 51, 52 are formed in such a way, and the components inside them are formed in such a way, that all areas inside the housing are easily accessible for cleaning, for example with a cleaning lance, in which case water and dirt are satisfactorily removed. Bearings present in the robot 100 are preferably sealed against dirt and water, and there are no small cracks and crevices present in the robot in which dirt can remain and which are difficult to reach for cleaning. The sheeting of the housing parts 51, 52 is preferably easy and quick to remove, so that the robot 100 can be cleaned on the inside.

Figure 5:
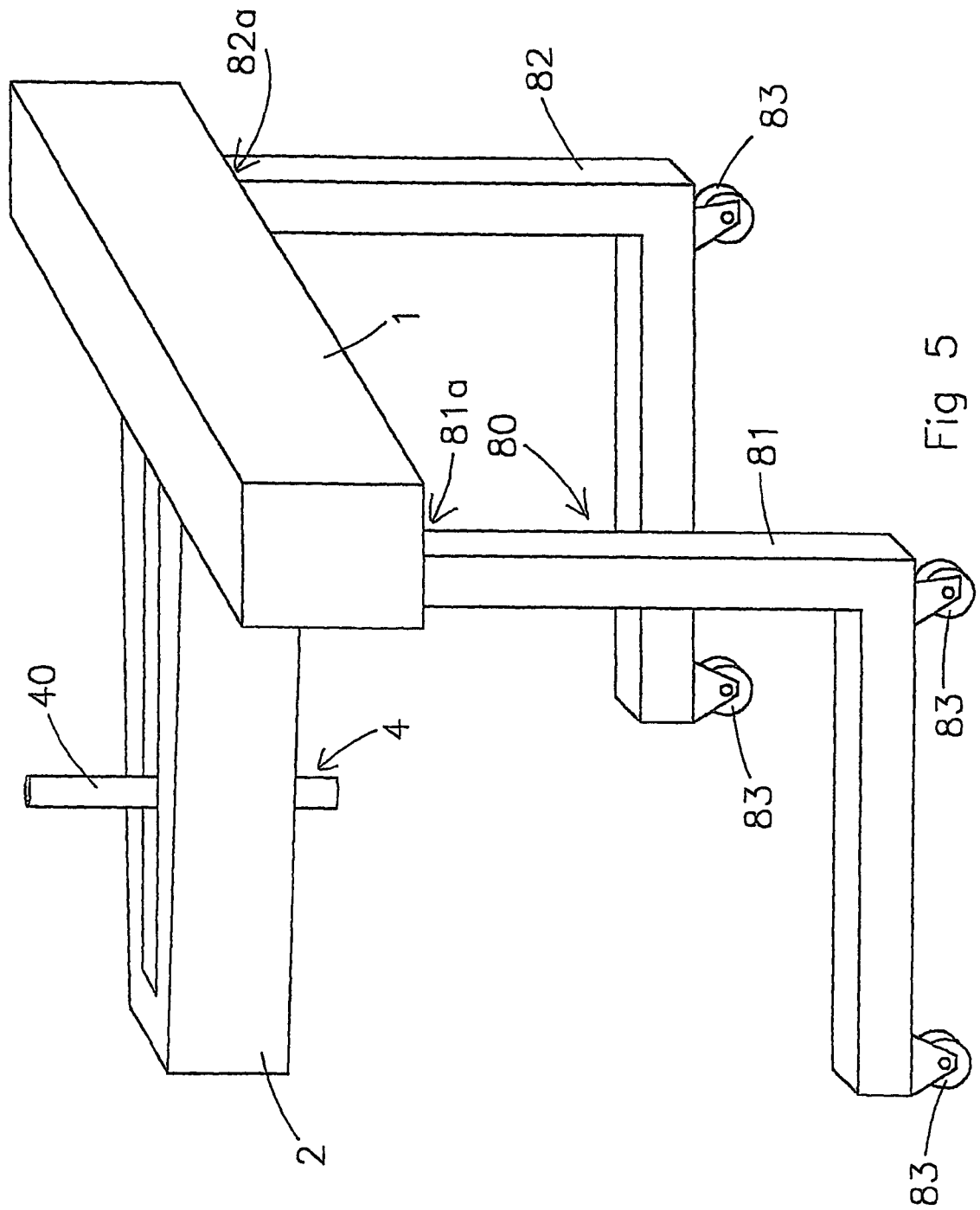
FIG. 5 shows a view in perspective of a robot according to the invention on a mobile frame.

FIG. 5 shows how the base 1 is fitted on a frame 80. The frame 80 has two L-shaped elements 81 and 82. The base 1 is placed on the end face 81a, 82a of one of the legs of the L-shape. Below the other legs of the L-shape facilities are provided in each case for the fitting of wheels. In the case shown two wheels 83 are fitted in each case below the legs of the L-shape. In an alternative embodiment (not shown) the base 1 can also be placed on a frame, mobile or otherwise, which is in the form of a closed case.

Figure 8:
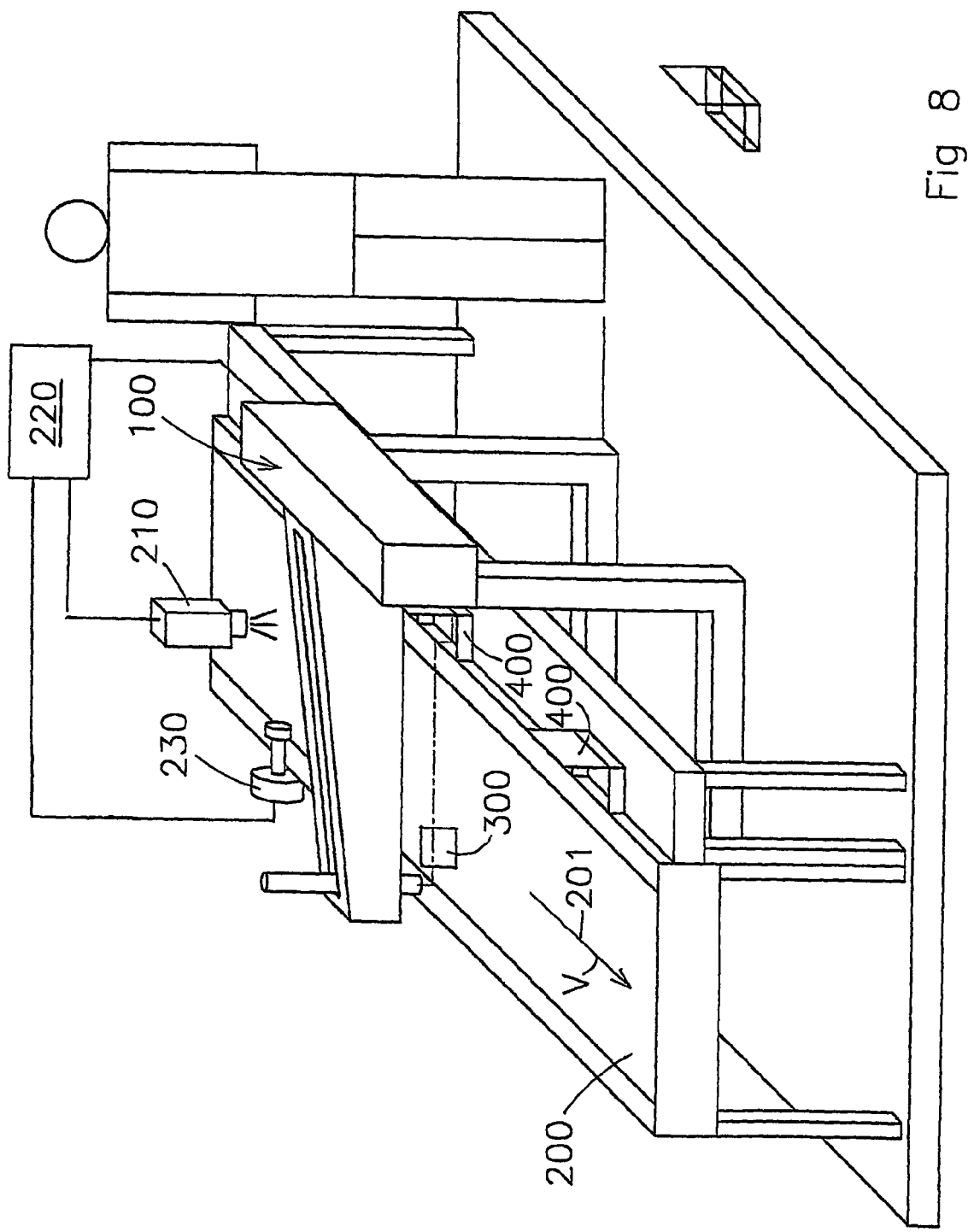
FIG. 8 shows a diagrammatic view of a conveyor system provided with a robot according to the invention.

FIG. 8 shows how a robot 100 according to the invention is used in a conveyor system comprising a conveyor belt 200, which is moving in the direction indicated by an arrow 201 at a speed v. The robot 100 picks up objects 300 from the conveyor belt 200 and places them in a packaging box 400 or another type of pack disposed alongside the conveyor belt 200.

Figure 11:
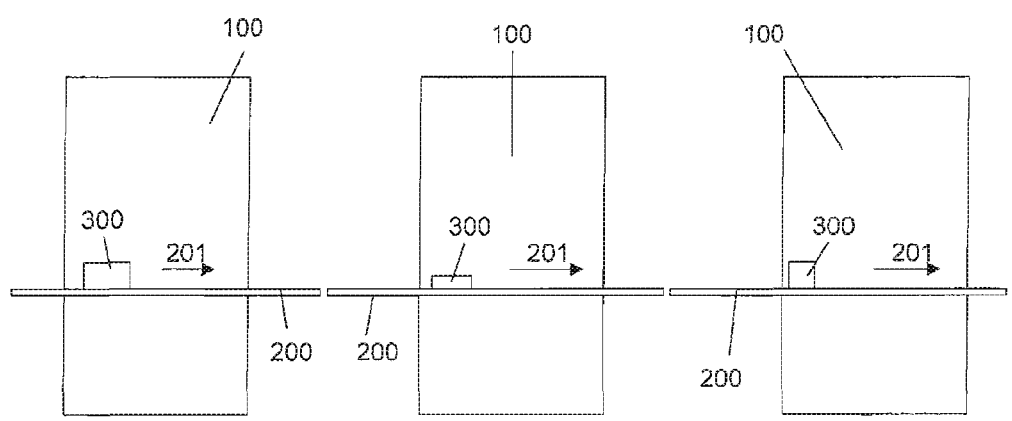

Such a conveyor system can also comprise several conveyor belts 200 disposed one behind the other and each having one or more robots 100 disposed alongside it. (see FIG. 11) The conveyor belt 200 disposed furthest downstream is preferably arranged in such a way that it moves at a lower speed of conveyance than the conveyor belts disposed more upstream. This means that the last remaining objects 300 remain longer within the reach of the last robot 100, so that the latter is given adequate opportunity to take all objects 300 off the belt 200.

If objects are lying in an ordered way on the conveyor 200, a row of products can then be detected by means of a camera 210, a photoelectric cell or another optical detection means disposed above the conveyor 200, after which the detection result is stored in a control computer. The speed v of the conveyor, in this example the conveyor belt 200, can be measured, for example by means of sensor 230 provided with a runner which makes contact with the surface of the conveyor belt 200. On the basis of the belt speed v, the detection result and a number of constants such as, for example, the distance between the robot 100 and detection means, the control computer 220 can calculate where and when the robot can pick up products from the belt 200 and can control the robot 100 accordingly. In this way it is also possible with one control computer 220 to control several robots disposed along the conveyor 200 so that said robots interact in order to empty the belt 200. The latter will be the case in particular if the speed v of the conveyor belt 200 or another conveyor is high.

If objects are being conveyed in an unordered way on the conveyor, the robot is then generally controlled on the basis of an image taken by a camera 210. The coordinates of the products on the conveyor 200 are determined by a control computer 220 on the basis of the camera image. On the basis of these coordinates and, inter alia, the belt speed v, the robot can be controlled by the computer 220 so that it takes the objects off the conveyor 200 and places them in a pack 400.

As can be seen in FIGS. 6a, 7b and 7c, the pulleys 31, 32 and 35, 36 are disposed on one side of the slide 3 relative to a central plane fixed by the second and third direction, which central plane extends through the longitudinal axis of the arm 2. Furthermore, the drive belt 5a for driving the slide 3 is immovably connected on one side of the slide 3 to said slide. The slide 3 (without the pulleys 31, 32, 35, 36) is preferably made of such a symmetrical design that the pulleys 31, 32 and/or 35, 36 can be removed easily and replaced relative to the central plane on the other side. Owing to a symmetrical design of the slide 3, the drive belt 5a for driving the slide 3 in the second direction is also easy to connect immovably on the other side of the slide 3. This changeover of the pulleys 31, 32, 35, 36 and the drive belt 5a is advantageous in particular if the robot has to operate moving along with and above a conveyor belt (see FIG. 8) and the robot for some reason or other has to be moved from one side to the other side of the belt, i.e. the direction of conveyance of the belt 200 relative to arm 2 is reversed. Owing to the symmetry of the robot arm 2 and the changeover of the pulleys 31, 32 and/or 35, 36 and the drive belt 5a, the robot remains exactly the same in kinematic terms. This means that, despite the different arrangement of the robot, the control software in the control computer 220 requires little or no adaptation. The robot is consequently very flexible as regards use.

Instead of changing over the pulleys 31, 32, 35, 36, another possibility offered by the symmetrical design of the slide 3 (without the pulleys 31, 32, 35, 36) is that the slide 3 could easily be removed from the arm 2 and could subsequently be mounted in the arm 2 turned around through 180° relative to the third direction, as a result of which the same advantages as those with the changeover of the pulleys 31, 32, 35, 36 are achieved. The symmetrical design of the slide 3 means that with the abovementioned reversal of the slide 3 the gripper 4 remains positioned on the central longitudinal axis of the arm 2. In other words, the gripper 4 retains exactly the same coordinates relative to the arm 2, so that in this case also little or no adjustment of the control software is required.

The invention claimed is:

1. A robot for gripping and handling one or more objects, which robot comprises:
    a stationary base with a first guide extending in a first direction,
    an arm comprising a second guide extending in a second direction at an angle relative to the first direction, which arm is connected to the base by way of the first guide in such a way that the arm is movable in the first direction,
    a slide which is arranged on the second guide and is movable in the second direction, wherein said first and second directions are in a common plane,
    a gripper supported by the slide, for gripping one or more objects, which gripper is movable in a third direction intersecting the plane of the first and second directions,
    a number of actuators provided in a stationary position on the base, for driving the arm, the slide and the gripper by means of pulling elements comprising drive belts, which are connected to the arm, the slide and the gripper respectively, one of said actuators being connected to said arm by a pulling element for driving movement of the arm in the first direction, another one of said actuators being connected to said slide by a pulling element for driving movement of the slide in the second direction, and a third one of said actuators being connected to said gripper by a pulling element for driving movement of the gripper in the third direction, wherein the gripper is situated in an plane extending in the second and third directions and intersecting the central longitudinal axis of the arm, and wherein the slide has a number of pulleys for guiding the pulling element for driving movement of the gripper in the third direction, which pulleys are provided on one side relative to the plane extending in the second and third directions and intersecting the central longitudinal axis of the arm, and which pulleys can be mounted in mirror image relative to the plane.

2. The robot according to claim 1, the slide can also be mounted in the arm in an orientation wherein the slide is turned 180° about an axis in the third direction, in such a way that after the reversal of the slide the gripper is still situated in the plane extending in the second and third directions and intersecting the central longitudinal axis of the arm.

3. The robot according to claim 1, wherein the gripper has a coinciding axis of translation and axis of rotation in the third direction.

4. The robot according to claim 1, wherein a first bush and a second bush are provided on the slide, which bushes are drivable by means of a separate pulling element, and in that the shaft member comprises a round shaft member projecting through the two bushes, the shaft member being provided on the periphery with cams placed in a spiral shape, the first bush being provided with a spiral-shaped groove which can interact with the cams on the shaft member in such a way that a rotation of the first bush results in a translation of the shaft member, and the second bush being provided with a straight axial groove which can interact with the cams in such a way that a rotation of the second bush results in a rotation of the shaft member.

5. The robot according to claim 1, wherein the robot comprises a housing which surrounds a space in which the guides, the slide, the actuators and the pulling elements are accommodated, the housing comprising a first housing part which surrounds the base and a second housing part which surrounds the arm.

6. The robot according to claim 5, wherein the first and second housing parts are made of plastic and/or stainless steel sheets.

7. The robot according to claim 1, wherein the actuators, viewed in the first direction, are distributed on the base.

8. The robot according to claim 1, wherein the actuators for driving the gripper are fitted in such a way that the gripper pulling elements are of equal length.

9. The robot according to claim 1, wherein the actuators are identical.

10. The robot according to claim 1, wherein the actuators are provided at the same height.

11. The robot according to claim 1, wherein one or more of the pulling elements and actuators are connected by means of a transmission formed by a shaft with one pulley, the pulling element in each case acting upon the one pulley, and the actuator acting on the shaft.

12. The robot according to claim 1, wherein one or more of the pulling elements and actuators are connected by means of a transmission formed by at least one shaft with a pulley which acts upon the pulling element, guide pulleys being further provided for guiding the pulling element along the pulley.

13. The robot according to claim 12, wherein the guide pulleys are arranged to slide along a line which connects the axes of the guide pulleys and are connected to a spring element in such a way that through the spring action the pulling element is tensioned by the pulleys in every operating state.

14. The robot according to claim 1, wherein the base is provided on a mobile frame.

15. A conveyor system comprising a conveyor and a robot according to claim 1, in which the robot is designed to pick up one or more objects from the conveyor and to place the one or more objects at a location next to the conveyor.

16. The conveyor system according to claim 15, which conveyor system comprises one or more conveyors disposed one behind the other and each comprising one or more robots disposed alongside the conveyor, the conveyor disposed furthest downstream being adapted to move at a lower speed of conveyance than the conveyors disposed more upstream.

17. The conveyor system according to claim 15, in which the robot is connected to control means for controlling the robot, the control means comprising a speed sensor for measuring the speed of the conveyor.

18. The conveyor system according to claim 17, in which the control means are provided with optical detection means for detecting the position of the one or more objects on the conveyor.

19. The robot according to claim 1, wherein the second guide extends in the second direction at a perpendicular angle relative to the first direction, and further wherein the gripper is movable in the third direction perpendicularly intersecting the plane of the first and second directions.

20. The robot according to claim 11, wherein the actuator acts on the shaft by way of a transmission pulling element.

21. A robot for gripping and handling one or more objects, which robot comprises:
a stationary base with a first guide extending in a first direction,
an arm comprising a second guide extending in a second direction at an angle relative to the first direction, which arm is connected to the base by way of the first guide in such a way that the arm is movable in the first direction,
a slide which is arranged on the second guide and is movable in the second direction, wherein said first and second directions are in a common plane,
a gripper supported by the slide, for gripping one or more objects, which gripper is movable in a third direction intersecting the plane of the first and second directions,
a number of actuators provided in a stationary position on the base, for driving the arm, the slide and the gripper by means of pulling elements, which are connected to the arm, the slide and the gripper respectively, one of said actuators being connected to said arm by a pulling element for driving movement of the arm in the first direction, another one of said actuators being connected to said slide by a pulling element for driving movement of the slide in the second direction, and a third one of said actuators being connected to said gripper by a pulling element for driving movement of the gripper in the third direction, wherein the gripper is situated in an plane extending in the second and third directions and intersecting the central longitudinal axis of the arm,
wherein the actuators are provided at the same height.

22. A robot for gripping and handling one or more objects, which robot comprises:
a stationary base with a first guide extending in a first direction,
an arm comprising a second guide extending in a second direction at an angle relative to the first direction, which arm is connected to the base by way of the first guide in such a way that the arm is movable in the first direction, a slide which is arranged on the second guide and is movable in the second direction, wherein said first and second directions are in a common plane, a gripper supported by the slide, for gripping one or more objects, which gripper is movable in a third direction intersecting the plane of the first and second directions, a number of actuators provided in a stationary position on the base, for driving the arm, the slide and the gripper by means of pulling elements, which are connected to the arm, the slide and the gripper respectively, one of said actuators being connected to said arm by a pulling element for driving movement of the arm in the first direction, another one of said actuators being connected to said slide by a pulling element for driving movement of the slide in the second direction, and a third one of said actuators being connected to said gripper by a pulling element for driving movement of the gripper in the third direction, wherein the gripper is situated in an plane extending in the second and third directions and intersecting the central longitudinal axis of the arm, wherein one or more of the pulling elements and actuators are connected by means of a transmission formed by at least one shaft with a pulley which acts upon the pulling element, guide pulleys being further provided for guiding the pulling element along the pulley, and wherein the guide pulleys are arranged to slide along a line which connects the axes of the guide pulleys and are connected to a spring element in such a way that through the spring action the pulling element is tensioned by the pulleys in every operating state.

* * * * *